Aug. 31, 1965    H. BARTH ETAL    3,203,274
BALANCE WEIGHT ARRANGEMENT FOR RECIPROCATING ENGINES
Filed June 27, 1962    3 Sheets-Sheet 1

Inventors
HANS BARTH
JOHANN SCHMUCK

By Toulmin & Toulmin
Attorneys

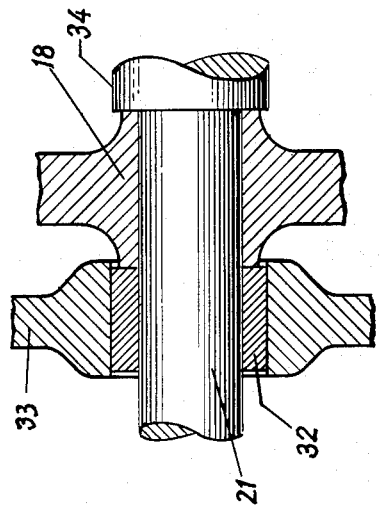
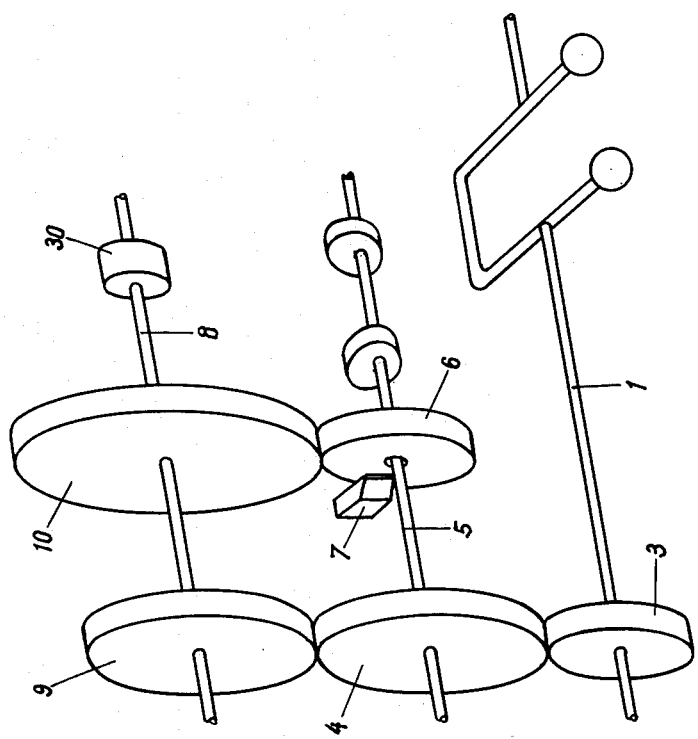

United States Patent Office 3,203,274
Patented Aug. 31, 1965

3,203,274
BALANCE WEIGHT ARRANGEMENT FOR RECIPROCATING ENGINES
Hans Barth, Aschaffenburg, and Johann Schmuck, Germering, near Munich, Germany, assignors to Gesellschaft fur Linde's Eismaschinen Aktiengesellschaft, Wiesbaden, Germany
Filed June 27, 1962, Ser. No. 205,768
Claims priority, application Germany, June 29, 1961, G 32,608; Mar. 17, 1962, G 34,503
5 Claims. (Cl. 74—604)

The present invention relates to the balancing of a reciprocating engine, more particularly, to an arrangement of balance weights which rotate at the same speed as the crankshaft but in the opposite direction of rotation.

It is well known to counterbalance a reciprocating engine in order to minimize or neutralize the inertia forces due to reciprocating and rotating masses of the engine. In one such counterbalancing arrangement balancing weights have been mounted on a special shaft mounted for that particular purpose in the casing of the engine. This shaft has then been used for driving various pieces of auxiliary equipment for the engine, such as the oil pump.

The provision of this special shaft was disadvantageous since the structure of the engine was undesirably complicated by adding this special shaft and the two bearing points therefor on the casing of the engine. Since it was desired to maintain the casing of the engine as small as possible, comparatively little space was available for the mounting of the balance weights on the special shaft. For this reason it was necessary that the balance weights be of a relatively large mass since these weights had relatively short moment arms. With such an arrangement, however, it was difficult to effectively balance the various forces arising through the operation of the engine.

Another proposal was to fixedly mount the balance weights on the camshaft, particularly in valve-controlled two-stroke engines wherein the valves are actuated by a camshaft which rotates at the same speed as the crankshaft but in the opposite direction.

The mounting of the balance weight on a shaft positioned parallel with respect to the crankshaft gave rise to other disadvantages. In this arrangement the centrifugal forces of the balance weight and of the masses rotating with the crankshaft oppose each other only when they act upon a line passing perpendicularly through both the axes of the balance weight shaft and the crankshaft. In all other positions of the crankshaft and the special shaft, the centrifugal forces of weights of these two shafts produce torques which must be absorbed by the engine supporting structure. As a result, the centrifugal forces of these rotating masses are transmitted to the engine casing through the respective bearings so that these bearings as well as the engine casing are subjected to additional stresses.

It is therefore the principal object of the present invention to provide a novel and improved balance weight arrangement for a reciprocating engine.

It is another object of the present invention to provide a balance weight arrangement for reciprocating engines wherein the necessity of a special shaft for the balance weights is eliminated.

It is a further object of the present invention to provide a balance weight arrangement for reciprocating engines which occupies a minimum of space without unduly complicating the engine structure.

The disadvantages of the prior art as discussed above are avoided and the objects of the present invention are achieved according to this invention wherein the balance weight is rotatably mounted on a shaft which is a component of the engine, such as the crankshaft or the camshaft. Since a conventional reciprocating engine having a camshaft is already provided with a gear with a relatively large diameter for driving the camshaft, the present invention can be applied in many engines by mounting the balance weight on the camshaft without necessitating any changes in the crankcase or engine casing structure as compared with a similar engine which is not provided with any balance weight. As a result, identical engine casings can be used either for relatively slow-speed engines wherein no counterbalancing is necessary or for high-speed engines wherein counterbalancing is necessary.

Another advantage of this arrangement is that the camshaft is usually positioned closer to the cylinders than the crankshaft. Thus, by mounting the balance weight on the free end of the camshaft of an engine which is supported on a mount positioned beneath the crankshaft, the balance weight has a relatively long lever arm with respect to the supporting points of the engine so that the forces produced by the oscillating masses of the engine are relatively well balanced and only relatively small residual torques are produced about the supporting points of the engine.

In a modification of this invention, the balance weight with a gear attached thereto is rotatably mounted on the crankshaft and drivingly connected to the crankshaft by an intermediate shaft having gears thereon meshing with the balance weight gear and a gear on the crankshaft so that the balance weight rotates at the same speed as the crankshaft but in the opposite direction. As a result of this arrangement no moments are produced by the rotating masses of the crankshaft and of the balance weight which moments have to be absorbed by the supporting structure of the engine. Any such forces are immediately absorbed and compensated at the crankshaft so that these forces are not transmitted to the engine casing by way of the crankshaft bearing. Further, since sufficient space is generally available for mounting the balance weight on the crankshaft, the weight can have a longer moment arm with respect to the axis of the crankshaft and hence the mass of the balance weight can be kept small. Thus, such balance weights will not necessitate any special elongation of the engine in an axial direction.

Other objects and advantages of the present invention will be apparent upon reference to the accompanying description when taken in conjunction with the following drawings wherein:

FIGURE 3 shows schematically a side perspective view of the arrangement of FIGURE 1; and FIGURE 4 shows a sectional view of another arrangement for mounting a balance weight on a crankshaft.

Figure 1:
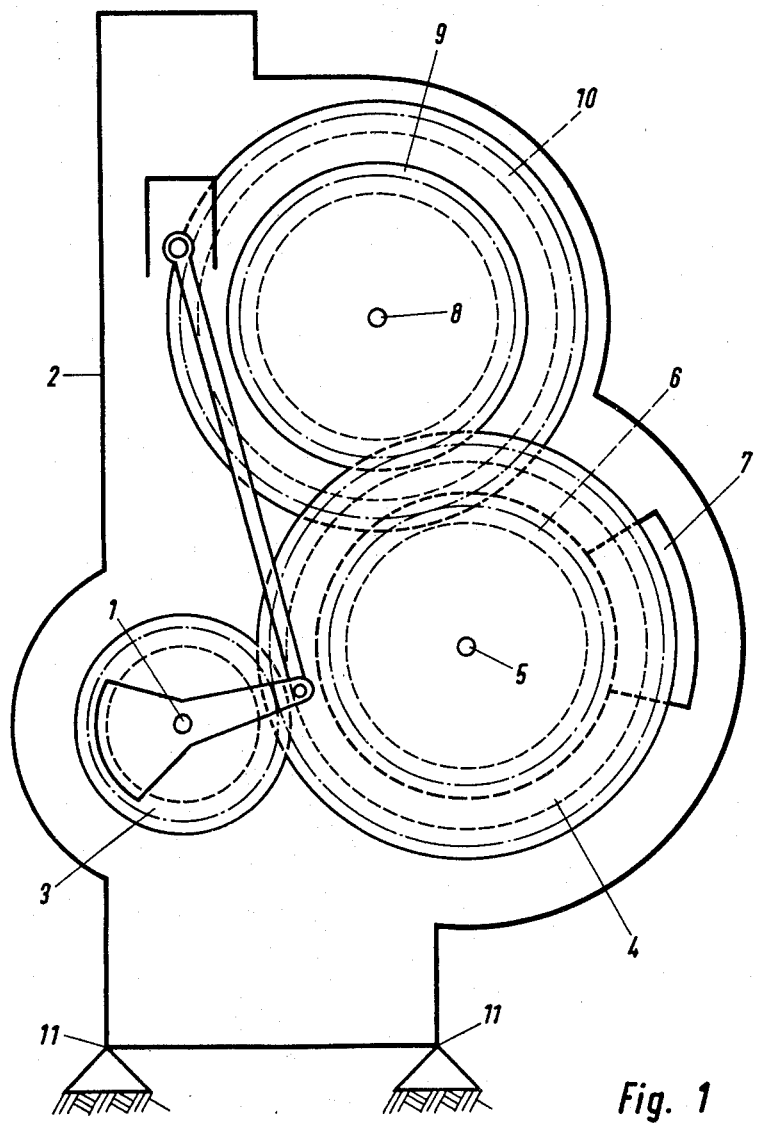
FIGURE 1 shows schematically an end view of an engine wherein the balance weight is mounted on the camshaft.

With reference to the drawings wherein like reference symbols indicate the same parts throughout the various views, and more particularly to FIGURES 1 and 3, there is schematically shown in FIGURE 1 a four cycle reciprocating internal combustion engine 2 having a crankshaft 1. A gear 3 is fixedly mounted on the crankshaft and meshes with a gear 4 fixedly mounted on one end of a camshaft 5 and having twice the diameter of gear 3 so that the cam shaft rotates at one-half the speed of the crankshaft but in the opposite direction. On the other or free end of the camshaft there is rotatably mounted a gear 6 upon which is fixedly secured a balance weight 7. An intermediate shaft 8 has gears 9 and 10 mounted thereon. The gear 10 meshes with the gear 6 and the gear 9 meshes with gear 4. The transmission ratios between the meshing pairs of gears 4 and 9 or 6 and 10 are selected so that the intermediate shaft 8 rotates at a speed twice that of the crankshaft 1. It should be noted that the gears of FIGURE 3 are not drawn to scale and hence their gear ratio is not shown in the drawings. The balance weight 7 rotates at the same speed as crankshaft 1 but in the opposite direction. Thus, the bearings of the balance weight which must absorb the centrifugal forces of the balance weight 7 are subjected to only half of the speed with respect to that of the crankshaft although the balance weight 7 rotates at the same speed as the crankshaft and in the same direction as the cam shaft because the camshaft rotates at half the speed of the crankshaft.

The intermediate shaft 8 can be employed to drive an auxiliary device which is normally operated at a high speed such as a blower, electric generator, a speed regulating device such as a governor, or an oil pump as indicated at 30. The intermediate shaft can also be employed as a high-speed power-take off shaft.

A second balance weight can also be fixedly mounted on the intermediate shaft to balance the aforementioned balance weight. In this arrangement the gear ratio is so selected that the speed of the intermediate shaft would be twice the speed of the crankshaft in order to counterbalance the forces set up by the camshaft and crankshaft. This speed relation is necessary since these forces are twice the frequency of the forces in the crankshaft which are balanced by the camshaft.

The engine 2 is mounted upon supports 11. Since the camshaft 5 is mounted at a relatively great distance from the plane in which the supports 11 are located, the centrifugal forces of the balancing weight 7 in a direction parallel to the plane of the supports produce torques which will be also relatively large.

The balancing weight can also be mounted upon the camshaft and driven in a manner known per se from the crankshaft by a pair of gears transmitting at a gear ratio of 1:1.

The advantages of arranging the balance weight upon the camshaft can thus be employed in a reciprocating engine wherein the camshaft rotates at one half of the speed of the crankshaft which relationship would be found in four-stroke internal combustion engines.

The arrangement of the balance weight as described above has the further advantage in that the balance weight may be positioned considerably closer to the next succeeding crank arm than has been previously possible. As a result, the free residual moment of forces exerted around the axis of the cylinder becomes very small.

Since a relatively large space is available for the mounting of the balance weight, the balance weight can rotate through a larger diameter circle and hence can be a relatively light mass. Since the mass of this balance weight can be light, it can be constructed quite small to occupy a minimum of space and to be located close to the crankshaft.

Figure 2:
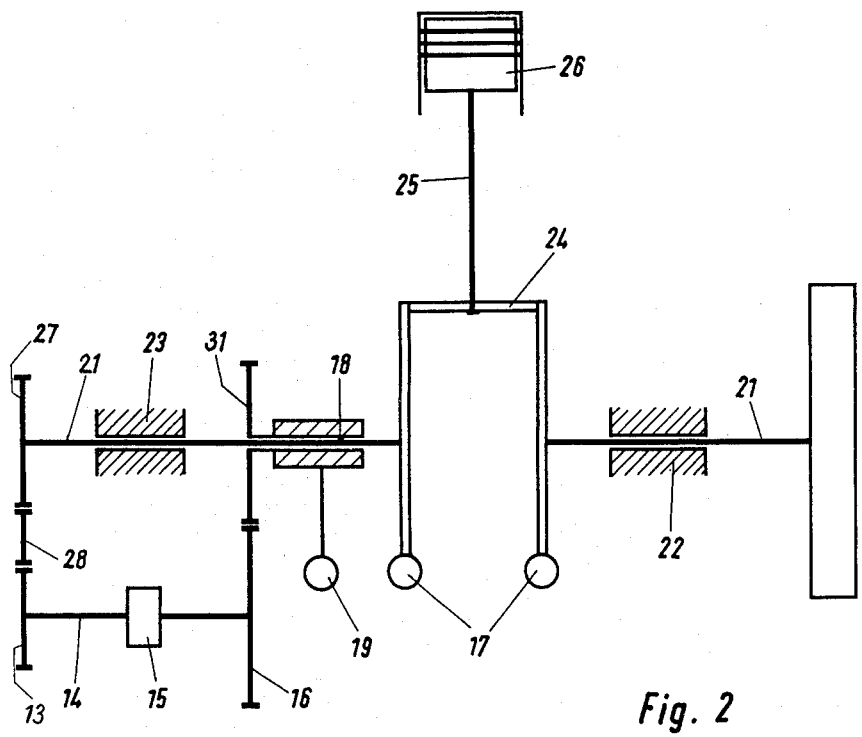
FIGURE 2 shows schematically an arrangement of the balance weight on the crankshaft of a reciprocating engine.

In the modification of FIGURE 2 the member upon which the balance weight is mounted is rotatably supported on the crankshaft. In this representation the crankshaft 21 of a reciprocating engine is journalled in two main bearings 22 and 23, which are mounted in the engine casing, but which casing is not illustrated in the drawings. The crankshaft is provided with a crankarm indicated at 24 to the crankpin of which is secured a connecting rod 25 whose upper end is attached to a piston 26. Two counterweights 17 are arranged on the crankarms 24 for counterbalancing the mass of the crankarm and of the rotating portion of the connecting rod 25.

Rotatably supported upon the crankshaft 21 is bearing housing 18 upon which is mounted a balance weight 19 and which is fixedly connected to a gear 31. A second gear 27 is fixedly mounted on the crankshaft 21 and meshes with an intermediate gear 28 which in turn meshes with a gear 13 fixedly mounted on an intermediate shaft 14. An oil pump 15 and a gear 16 are mounted on the intermediate shaft 14 and the gear 16 meshes with the gear 31.

In this arrangement the balance weight 19 rotates in the opposite direction with respect to the crankshaft 21 and accordingly with the crankarm 24 and the counterweights 17 but with the same speed.

The intermediate shaft 14 may be used for driving other accessory equipment in addition to or in place of the oil pump.

As a further modification the intermediate gear 28 could be positioned between the gears 16 and 31 in which arrangement 27 and 13 would be in direct driving connection with each other. This modification has the advantage that any force diverted for the secondary drive, such as for the oil pump 15 is not transmitted through the intermediate gear 28.

The arrangement of FIGURE 2 discloses the counterweight as being rotatably supported on the crankshaft between the two main bearings therefor. In single-cylinder engines the crankshaft bearings are customarily positioned in the casing as great a distance from each other as possible as limited by the dimensions of the casing in order to produce the minimal moment at the crankshaft bearings resulting from lateral forces acting upon the crankshaft such as, for example, the pull of the driving belt upon this crankshaft. It is therefore particularly suitable in such engines to position the balance weight between the crankshaft main bearings of the casing. This arrangement results in the shortest possible distance of the balance weight along the axis of the crankshaft from the plane in which the action of the forces which are to be balanced are rotating.

As may be seen in FIGURE 4, the balance weight 19 can be mounted on a journal box 18 which is heat-hardened and rotatably positioned between a collar 34 mounted on or integral with the crankshaft 21 and a bearing 32 secured to the crankshaft by a shrink-fit and journalled in a wall 33 of the engine casing to provide one main bearing for the crankshaft. Thus, the bearing housing is retained against any axial displacement of the crankshaft by the collar at one end and the bearing on the other. Further, this arrangement facilitates replacement or repair or removal of the balance weight bearing box from the crankshaft. When it is necessary to replace a main bearing of the crankshaft, the journal box for the balance weight can be readily replaced by a new one if necessary.

At normal speeds of reciprocating engines no problems will arise because of the relative movement of the inner and outer bearing races which rotatably support the counterweight upon the crankshaft. Even though these bearing races are moving with respect to each other at twice the speed of the engine, such relative speeds will give rise to no difficulty considering the loads and the available speeds. When anti-friction bearings are employed, the balls or rolls will rotate at a very low absolute speed around the axis of the crankshaft so that very little, if any, centrifugal forces will be produced to urge the roll bodies against the outer race of the bearing.

It is therefore apparent that the present invention provides a balance weight arrangement for reciprocating engines wherein by mounting the balance weight upon a shaft conventionally provided with the engine, the balance weight can be positioned at a relatively great distance from the axis of its rotating shaft without providing any additional space in the casing of the engine.

It will be understood that this invention is susceptible to modification in order to adapt it to different usages and conditions and, accordingly, it is desired to comprehend such modifications within this invention as may fall within the scope of the appended claims.

What is claimed is:

1. In a reciprocating engine, a combination of a crankshaft, a camshaft operatively connected to the engine, means operatively driving one end of said camshaft from said crankshaft, and a balancing weight rotatably mounted on said camshaft, and an intermediate shaft having first and second gears thereon with said first gear being driven by said camshaft and said second gear driving said balancing weight.

2. In a reciprocating engine, a combination of a crankshaft, a camshaft operatively connected to the engine, means operatively driving one end of said camshaft from said crankshaft, and a balancing weight rotatably mounted on said camshaft, and an intermediate shaft having first and second gears thereon with said first gear being driven by said camshaft and said second gear driving said balancing weight, said intermediate shaft being drivingly connected to an auxiliary apparatus for the engine.

3. In a reciprocating engine, a combination of a crankshaft, a camshaft operatively connected to the engine, means operatively driving one end of said camshaft from said crankshaft, a balancing weight rotatably mounted on the said camshaft, an intermediate shaft having first and second gears thereon with said first gear being driven by said camshaft at a speed twice that of the camshaft and said second gear driving said balancing weight, and a second balancing weight fixedly mounted on said intermediate shaft.

4. In a reciprocating engine, a combination engine, a combination of a second shaft, a crankshaft, a bearing housing rotatably mounted on said crankshaft, a balancing weight attached to said bearing housing, and means operatively connecting said balance weight to said crankshaft through said second shaft for rotating said balancing weight with respect to the operation of the engine in a direction opposite to the rotation of said crankshaft.

5. In a reciprocating engine, a combination of a second shaft, a crankshaft, a bearing housing rotatably mounted on said crankshaft, a balancing weight attached to said bearing housing, and means operatively connecting said balance weight to said crankshaft through said second shaft for rotating said balancing weight with respect to the operation of the engine in a direction opposite to the rotation of said crankshaft, and said second shaft being drivingly connected to an auxiliary means from said engine.

References Cited by the Examiner

UNITED STATES PATENTS

| | | | |
|---|---|---|---|
| 1,282,571, | 10/18 | Guay | 74—604 X |
| 1,664,942 | 4/28 | Pope | 74—604 |
| 1,898,459 | 2/33 | Newcomb | 74—604 |
| 2,407,102 | 9/46 | Ryder | 74—604 |
| 2,856,603 | 10/58 | Burns et al. | 74—604 X |

BROUGHTON G. DURHAM, *Primary Examiner.*